(12) United States Patent
Assarpour et al.

(10) Patent No.: US 8,824,293 B2
(45) Date of Patent: Sep. 2, 2014

(54) IMPLEMENTATION OF A QOS PROCESSING FILTER TO MANAGE UPSTREAM OVER-SUBSCRIPTION

(75) Inventors: Hamid Assarpour, Arlington, MA (US); Olga Mindlin, Waban, MA (US)

(73) Assignee: Avaya, Inc., Basking Ridge, NJ (US)

( * ) Notice: Subject to any disclaimer, the term of this patent is extended or adjusted under 35 U.S.C. 154(b) by 540 days.

(21) Appl. No.: 13/037,083

(22) Filed: Feb. 28, 2011

(65) Prior Publication Data

US 2012/0218894 A1   Aug. 30, 2012

(51) Int. Cl.
*G01R 31/08* (2006.01)

(52) U.S. Cl.
USPC ........................................................ 370/235

(58) Field of Classification Search
None
See application file for complete search history.

(56) References Cited

U.S. PATENT DOCUMENTS

| | | | |
|---|---|---|---|
| 7,200,114 B1 * | 4/2007 | Tse-Au | 370/231 |
| 2012/0106546 A1 * | 5/2012 | Sinha | 370/389 |

OTHER PUBLICATIONS

XGS 9016/9008 product specifications, 10 Gigabit Ethernet layer 3 switch Family, River stone networks, 2003, 1-4.*

* cited by examiner

*Primary Examiner* — Chi Pham
*Assistant Examiner* — Kouroush Mohebbi
(74) *Attorney, Agent, or Firm* — Anderson Gorecki & Rouille LLP

(57) ABSTRACT

A switch device can be configured to operate in a manner that was not originally intended. For example, a switch device can be a Broadcom XGS type of device that is configured with a packet-processing unit to perform line speed lookups in accordance with a default configuration. The default configuration can include classifying and forwarding received packets to an upstream interface based on VLAN information. The default configuration can be overwritten such that the switch device operates in a different manner than originally intended. For example, the switch device can be reconfigured to include mapping rules that specify different QoS data to be assigned to different type of received packets. Subsequent to utilizing the maps to identify QoS information for received packets, the reconfigured switch device uses the QoS information to forward the packets to queues in an upstream interface.

16 Claims, 7 Drawing Sheets

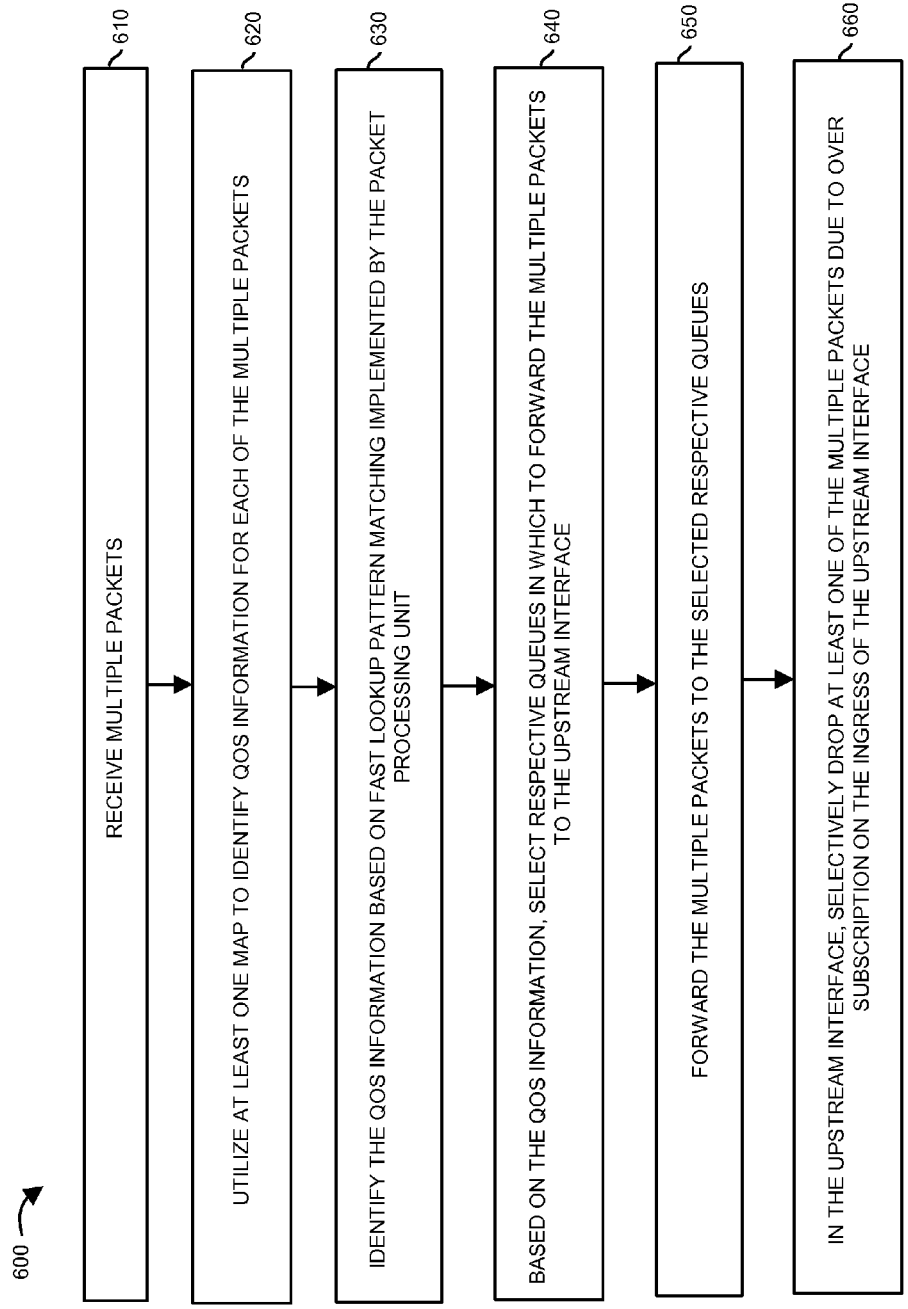

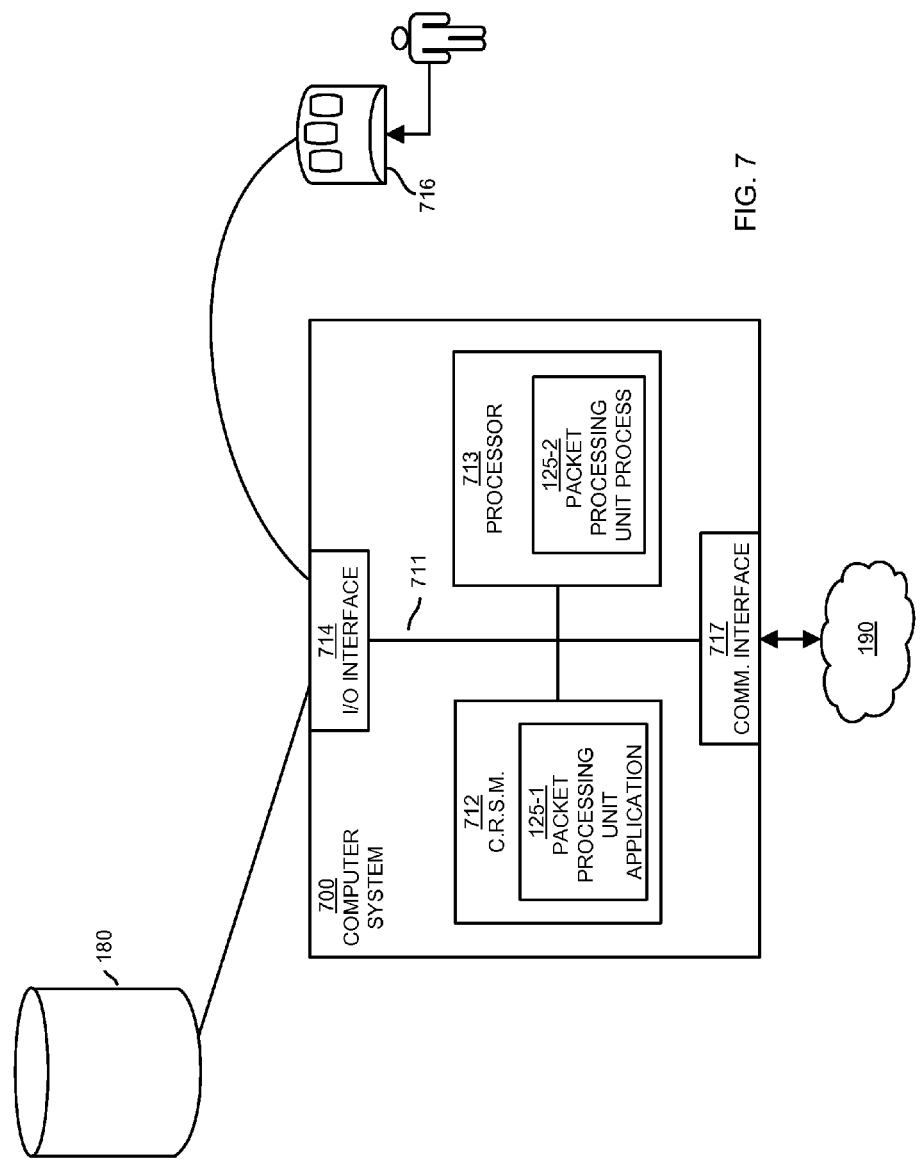

IMPLEMENTATION OF A QOS PROCESSING FILTER TO MANAGE UPSTREAM OVER-SUBSCRIPTION

BACKGROUND

Modern network architectures typically struggle to keep up with bandwidth demands of users as user expectations for bandwidth continually increases amid ever evolving bandwidth hungry applications. In certain cases, user's equipment can become so burdened with traffic that the user's equipment does not perform well. For example, to the dismay of a respective user, one or more user applications may become inordinately slow to respond due to the inability to handle too many packets.

BRIEF DESCRIPTION

There are deficiencies associated with conventional processing of packets in a network environment. For example, according to conventional systems as discussed above, an interface through which a user receives packets over the internet can be oversubscribed with the burden of handling too many packets. Once overburdened, there is no certainty that conventional packet processing equipment will be able to execute and/or process the control plane packets in a timely manner. In other words, based on conventional systems, a latency of processing packets may become unacceptable for at least certain received packets. In such an instance, the user may become dissatisfied with their network equipment due to low performance.

Embodiments herein deviate with respect to conventional systems for processing packets forwarded to an upstream interface that is oversubscribed on ingress. That is, embodiments herein include a unique way of reconfiguring a switch device to enable upstream management of packets by discarding lower priority traffic as needed while guaranteeing high priority traffic at the upstream interface.

More specifically, one embodiment herein includes implementing a packet-processing unit in a switch device. The switch device is in communication with an upstream interface that is oversubscribed on ingress. In one embodiment, the packet-processing unit receives multiple packets destined for the upstream interface. The packet-processing unit utilizes at least one map to identify QoS or priority information for each of the multiple packets. Based on the QoS information or priority information, packet-processing unit selects respective queues in which to forward the multiple packets to the upstream interface. The packet-processing unit forwards the multiple packets to the selected respective queues.

The upstream interface such as queues or other resources can selectively drop packets due to over subscription on the ingress of the upstream interface. That is, if there is not sufficient bandwidth available for the upstream interface to process and forward all packets in low priority queues to a respective destination, then the upstream interface can drop the excess low priority packets in favor of delivering more important, higher priority packets to their respective destinations.

In one embodiment, the packet-processing unit is configured to identify the QoS information for packets based on fast lookup pattern matching implemented by the packet-processing unit. For example, the packet-processing unit can include user configurable maps. Accordingly, a respective user can provide input indicating a how to prioritize different types of received packets.

Upon receipt of a packet, the packet-processing unit identifies attributes of the received packet such as its type, which port it was received, etc. The packet-processing unit then utilizes the attribute information and maps to identify corresponding priority forwarding information for the packet.

The packet-processing unit can be configured to perform line speed lookups for the multiple packets. In other words, the packet-processing unit can substantially perform lookups of QoS information as fast or faster than a rate of receiving the packets. In one embodiment, the packet-processing unit performs lookups based on TCAM (Ternary Content Addressable Memory).

The packet-processing unit can be configured to utilize the identified QoS information (based on application of the maps) to forward the packets to queues in the upstream interface. For example, the packet-processing unit can utilize one or more maps to identify QoS information for the packets. For each packet, the packet-processing unit can be configured to select a QoS priority level amongst multiple different QoS priority levels; and prior to forwarding of the packet, modifying a header in the given packet to include the selected QoS priority level. The packet-processing unit then forwards the packets to the upstream interface. The packets are routed to the appropriate queues based on the QoS information stored in the header. In other words, subsequent resources use the QoS information to identify in which queue to place the respective packet.

If the packet-processing unit detects that a received packet is a control packet, the packet-processing unit can discard originally received QoS information derived from the maps. In such an instance, the packet-processing unit applies a set of control plane packet rules especially for control plane packet classification in order to determine QoS information for the control packets. Thus, embodiments herein can include: receiving QoS information for a given packet of the multiple packets; detecting that the given packet is a control plane packet; identifying alternative QoS information for the control plane packet based on the control plane packet QoS rules; and forwarding the control plane packet to the upstream interface based on the alternative QoS information derived for the control packets.

Another embodiment herein includes configuring a switch device (e.g., a Broadcom device) to operate in a manner that was not originally intended. For example, one embodiment herein includes receiving a switch device. The switch device can be a Broadcom XGS type of device such as Firebolt, Scorpion, and Trident types of switch devices.

The switch device can include a packet-processing unit to perform line speed lookups in accordance with a default configuration of the switch device. In one embodiment, the default configuration of the switch device is to classify and forward received packets based on VLAN information. Embodiments herein include overriding original settings of the switch device to reconfigure the packet-processing unit to include mapping and respective rules that specify different QoS data to be assigned to different type of packets. During operation, the reconfigured packet-processing unit of the switch device utilizes maps or mapping rules to identify QoS information for received packets. The packet-processing unit subsequently selects queues in which to forward the packet based on the QoS information as discussed herein.

In an example embodiment, overriding default settings of the switch device can include configuring the packet-processing unit to include multiple lookup tables in which to map received packets to respective QoS information. Overriding default settings of the switch device also can include configuring the packet-processing unit to be a multiple-stage QoS filter in which a first stage performs line speed lookups of QoS information for received packets and a second stage selects forwarding queues in which to forward the packets based on the QoS information.

In a more specific embodiment, an example QoS implementation for a Broadcom multi-layer Strata Switches utilizes two-stage ContentAware ingress filter processor. The switch device can be a Firebolt, Scorpion, and Trident type of device connected via HiGig interface to the up-stream packet processor. As previously discussed, the upstream interface such as a HiGig interface can be oversubscribed on ingress. The implementation of a two-stage filter processor allows managing ingress over subscription of forwarding resources by intelligently discarding low priority traffic while guaranteeing bandwidth to the critical high priority traffic.

In one embodiment, the VLAN-based ingress pre-processor (VFP) is programmed with the tables containing port QoS levels and the information on whether the port is trusted at L3 and L2 traffic layers. The VFP also can be configured to include mappings of DSCP and 802.1p values to the internal QoS levels.

In accordance with further embodiments, the VFP stage is a pre-classifier that does not drop or modify received packets. That is, the VFP stage processes packets to identify there relative level of importance but the assignment of QoS information is performed at a subsequent stage (e.g., IFP stage).

Every incoming packet is qualified against these tables, packet DSCP and 802.1p values, whether the packet is tagged or untagged, bridged or routed. The assigned QoS level from each table (which at this stage is independent of the packet type) is passed to the next stage filter processor (IFP).

The IFP stage sets internal QoS levels for all traffic types. It contains multiple rules specifying control protocol packets, such as STP BPDUs, OSPF hellos, ARP requests, etc. The control packets are assigned QoS levels based on their protocol type. IFP also selects the QoS level for the data packets based on whether the packet is tagged, untagged, bridged, or routed, and information passed to it by VFP. In other words, the IFP can be configured to use classification information as detected by the VFP in order to determine QoS associated with the data packets. The appropriate HiGig scheduler queue is selected based on the assigned QoS level (as determined by the VFP if it is a data packet and as determined by the IFP if it is a control packet), thus ensuring preferential handling of the high priority traffic. Packets can be classified based on a parameter such as L2 information. L3 functionality of the packet can be disabled.

In one embodiment, the IFP stage can be configured to drop control and/or data packets depending on a set of rules employed by the IFP stage. In one embodiment, packets of improper length are dropped.

IFP also passes the selected QoS level via priority field in HiGig header to the network packet processor, which performs destination lookup, assigns outgoing packet DSCP and 802.1p values and forwards the packets through the fabric.

This 2-stage approach (VFP processing stage followed by IFP processing stage) allows selecting and setting QoS levels for all packet types forwarded to the upstream interface that is over subscribed with ingress packets. The upstream interface selectively drops packets based on QoS levels selected downstream by the VFP and IFP processing stages.

These and other embodiment variations are discussed in more detail below.

As mentioned above, note that embodiments herein can include a configuration of one or more computerized devices, routers, network, workstations, handheld or laptop computers, or the like to carry out and/or support any or all of the method operations disclosed herein. In other words, one or more computerized devices or processors can be programmed and/or configured to operate as explained herein to carry out different embodiments as discussed herein.

Yet other embodiments herein include software programs to perform the steps and operations summarized above and disclosed in detail below. One such embodiment comprises a computer-readable, hardware storage resource including computer program logic, instructions, etc., encoded thereon that, when performed in a computerized device having a processor and corresponding memory, programs and/or causes the processor to perform any of the operations disclosed herein. Such arrangements can be provided as software, code, and/or other data (e.g., data structures) arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC). The software or firmware or other such configurations can be installed onto a computerized device to cause the computerized device to perform the techniques explained herein.

Accordingly, one particular embodiment of the present disclosure is directed to a computer program product that includes a computer-readable hardware storage medium having instructions stored thereon for supporting operations such as processing control plane packets. For example, in one embodiment, the instructions, when carried out by a processor of a respective computer device, cause the processor to: in a packet processing unit of a switch device: receive multiple packets; utilize at least one map to identify QoS information for each of the multiple packets; based on the QoS information, select respective queues in which to forward the multiple packets to the upstream interface; and forward the multiple packets to the selected respective queues.

The ordering of the steps has been added for clarity sake. These steps can be performed in any suitable order.

Other embodiments of the present disclosure include software programs and/or respective hardware to perform any of the method embodiment steps and operations summarized above and disclosed in detail below.

Also, it is to be understood that the system, method, apparatus, instructions on computer readable storage media, etc., as discussed herein can be embodied strictly as a software program, as a hybrid of software and hardware, or as hardware alone such as within a processor, or within an operating system or a within a software application. As discussed above, techniques herein are well suited for use in software and/or hardware applications that process control plane packets. However, it should be noted that embodiments herein are not limited to use in such applications and that the techniques discussed herein are well suited for other applications as well.

Additionally, although each of the different features, techniques, configurations, etc., herein may be discussed in different places of this disclosure, it is intended that each of the concepts can be executed independently of each other or in combination with each other. Accordingly, the one or more present inventions, embodiments, etc., as described herein can be embodied and viewed in many different ways.

Also, note that this preliminary discussion of embodiments herein does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

FIG. 6 is an example flowchart illustrating a technique of forwarding packets according to embodiments herein.

FIG. 7 is a diagram illustrating an example computer architecture for executing computer code, software, applications, logic, etc., according to embodiments herein.

DETAILED DESCRIPTION

In a network switching environment, as is typically employed for Internet and other public and private networks, network switching devices (switches) are commonly employed to provide packet switching functions. Such switches are specifically designed to provide local switching based on L2/L3 forwarding, either within a single device or within multiple devices interconnected via mechanisms such as "HiGig" links as disclosed herein. Network switches typically employ forwarding rules to compute an outgoing port for message traffic (packets) received on an incoming port.

In a network switch, routing logic is defined by routing, or forwarding rules indicative of ports to which message traffic is to be switched based on control fields in the message. One set of control fields is invokable for specifying a destination module and destination port of a downstream device. Configurations herein are based, in part, on the observation that the control fields in the trunk header may be disabled and overwritten, or overloaded, with additional information that is simply passed downstream, rather than employed for switching control. In one configuration, a so-called XGS switch, marketed commercially by Broadcom Corporation of Irvine, Calif., is a single-chip switching device commonly used to provide packet switching functions, and is configurable with a HiGig port as a trunk port. Other switching devices may be similarly configured.

An XGS switch device designed for processing and forwarding network packets can be configured to operate in a manner that was not originally intended for the switch device. For example, the Broadcom XGS switch device can be configured with a packet-processing unit to perform relatively fast lookups in accordance with a default configuration. In addition to fast lookups, the default configuration of the switch device can support classifying and forwarding received packets to an upstream interface based on VLAN information. The default configuration of the switch device can be overwritten or modified such that the switch device operates in a novel way. For example, in one embodiment, the switch device is reconfigured to include mapping rules that specify different QoS data to be assigned to different types of received packets. Subsequent to utilizing the maps to identify QoS information for one or more received packets, the reconfigured switch device uses the QoS information to select queues in an upstream interface in which to forward the one or more packets.

Figure 1:
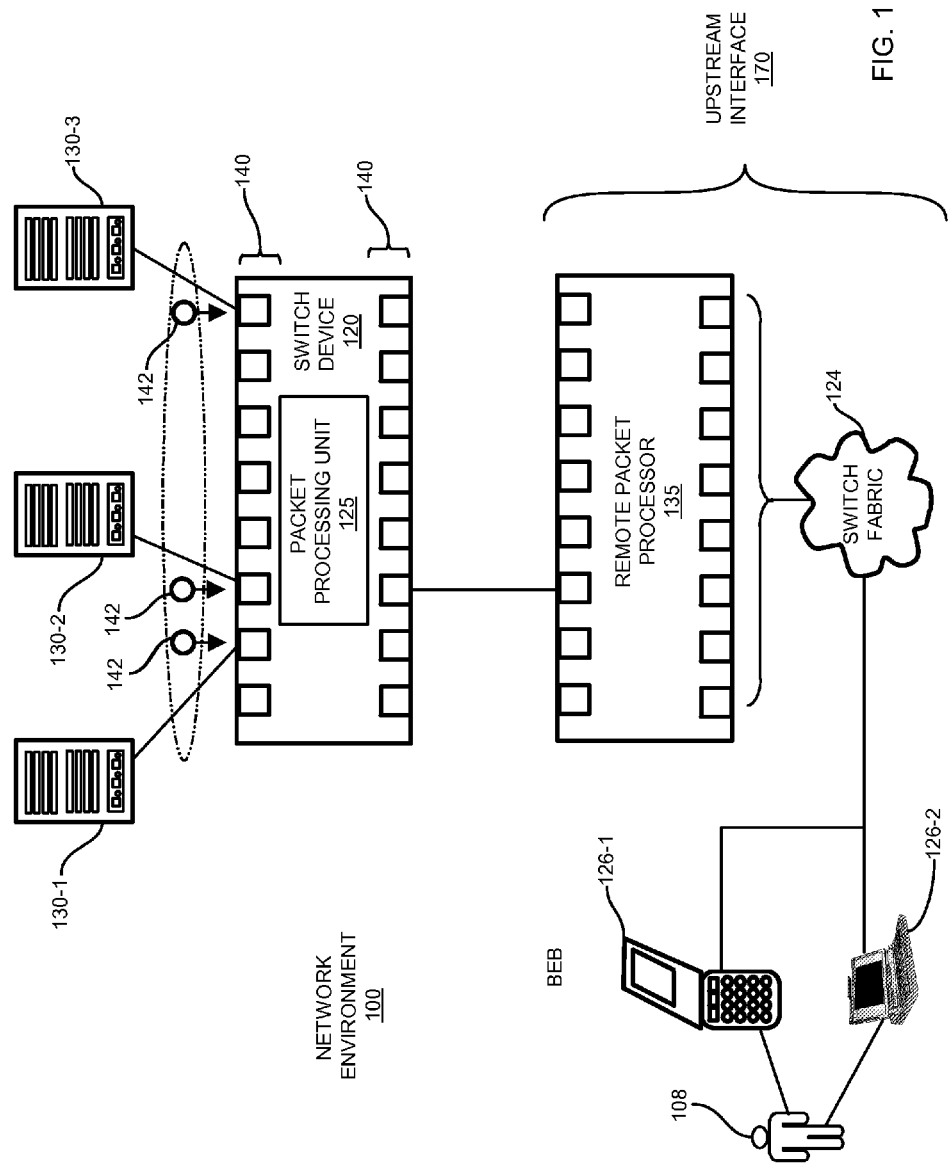
FIG. 1 is an example diagram of a switch resource in a network environment according to embodiments herein.

FIG. 1 is an example diagram illustrating a network environment 100 including resources to process and forward received network packets according to embodiments herein.

Network environment 100 includes a switch device 120 for receiving network packets 142 from so-called downstream resources such as switches 130 (e.g., switch 130-1, switch 130-2, switch 130-3, and so on). Switch device 120 receives the network packets 142 on one or more ports 140. In one embodiment, the switch device 120 connects via one or more communication links to the upstream interface 170 (e.g., one or more resources towards user 108.

In one embodiment, the switch device 120 forwards the network packets 142 to upstream interface 170. Upstream interface 170 forwards the network packets to destination devices such as user device 126-1 and 126-2.

As discussed herein, and as its name suggests, packet-processing unit 125 processes the received network packets 142 and selectively forwards such packets through one or more ports 140 to remote queues residing in upstream interface 170. The remote queues can reside in any resource such as in switch fabric 124, remote packet processor 135, user operated devices, etc. Each of the queues in the upstream interface 170 can support different QoS (Quality of Service) processing.

In general, QoS provides the ability to provide different priority processing and forwarding to different types of network packets. Based on different QoS levels, higher priority traffic is typically guaranteed over lower priority traffic. Accordingly, the higher priority traffic gets forwarded to the applications run by user 108 on respective devices 126.

In one embodiment, the upstream interface 170 is over subscribed on ingress. That is, one or more applications operated by the user 108 may cause the upstream interface 170 to be inundated with more network packets than it is able to reasonably handle and forward on to applications running in user device 126-1 (e.g., a smart phone) and/or user device 126-2 (e.g., a computer device). In general, the user devices 126 can be any type of devices that receive network packets from one or more remote servers in network environment 100.

Embodiments herein deviate with respect to conventional systems for processing packets forwarded to an upstream interface 170 that is oversubscribed on ingress. For example, embodiments herein include a unique way of reconfiguring a switch device 120 in network environment 100 to facilitate management of network packets upstream by discarding of low priority traffic, yet guaranteeing transmission of high priority traffic to user devices 126.

As previously discussed, switch device 120 is in communication with the upstream interface 170, which happens to be oversubscribed on ingress. In other words, the upstream interface 170 receives more network packets than it is able to forward on to the destination devices 126. One embodiment herein includes configuring the packet-processing unit 125 in switch device 120 to process the received network packets 142 to identify an appropriate QoS level for forwarding and future processing. The switch device 120 forwards the packets based on QoS instead of L2/L3 forwarding rules.

Figure 2:
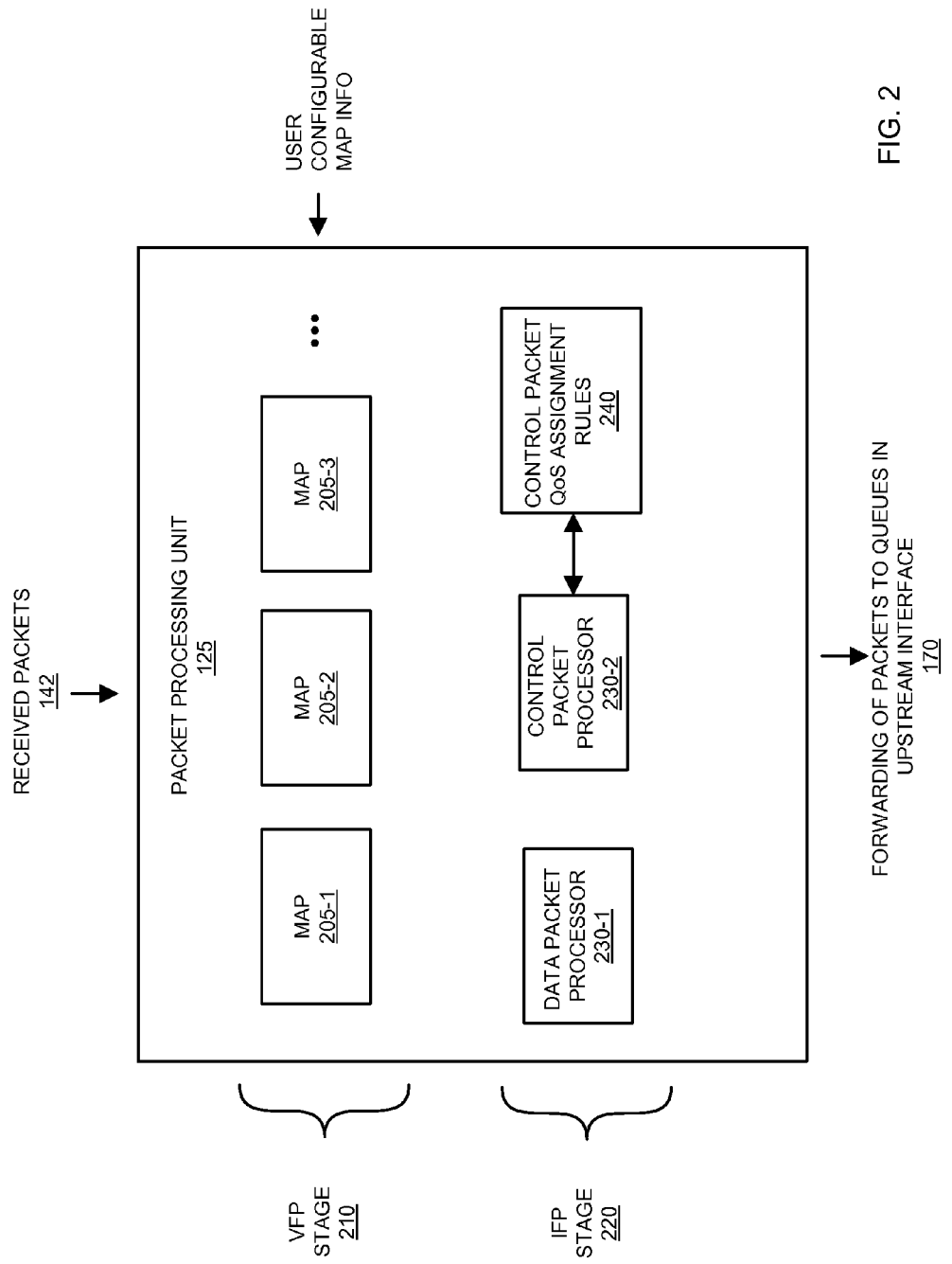
FIG. 2 is an example diagram illustrating a multistage packet filter according to embodiments herein.

FIG. 2 is an example diagram illustrating a more detailed packet-processing unit 125 according to embodiments herein.

The packet-processing unit 125 can be configured to include VFP stage 210 and IFP stage 220. By way of a non-limiting example, the VFP stage 210 can be a VLAN-based ingress pre-processor stage; the IFP stage 220 can be a QoS filter processing stage as discussed herein.

In one embodiment, the VFP stage 210 is programmed with maps 205 containing port QOS levels and the information on whether the port is trusted at L3 and L2 traffic layers. The VFP also can be configured to include mappings of DSCP and 802.1p values to the internal QoS levels.

More specifically, VFP stage 210 includes maps 205 (e.g., map 205-1, map 205-2, map 205-3, etc.). In one embodiment, map 205-1 defines a mapping of different types of DSCP network packets to different QoS levels; map 205-2 defines a mapping of different types of 802.1p type network packets to different QoS levels; map 205-3 defines a mapping of different types of packets received on a particular port to different QoS levels; and so on.

Every incoming packet can be qualified against one or more maps 205 in the packet-processing unit 125, packet DSCP and 802.1p values, whether the packet is tagged or untagged, bridged or routed. The assigned QoS level from each table (which at this stage is independent of the packet type) is passed to the next stage filter processor (IFP stage 220).

Note that the maps 205 are configurable. For example, a user 108 or other source can select a priority level to be assigned to each of the different types of network packets forwarded by the switch device 120.

During operation, via application of maps 205, a relative level of importance or QoS level can be determined for each of the received network packets. For example, as shown, the packet-processing unit 125 receives, from resources such as switches 130, multiple network packets 142 destined for the upstream interface 170 and devices 126. The VFP stage 210 of the packet-processing unit 120 applies an appropriate one or more map 205 to the received network packets to identify QoS information for each of the multiple network packets 142.

In other words, upon receipt of a packet, the packet-processing unit 125 identifies attributes of the received packet such as its type, which port it was received, etc. The packet-processing unit then utilizes the attribute information and one or more maps 205 to identify corresponding QoS information for the packet.

As an example, assume that the switch device 120 receives a set of packets on a particular port of the switch device 120. The VFP stage 210 can be configured to utilize a particular map such as map 205-3 to identify QoS information for packets received on a particular port. Map 205-3 may be designated for identifying a QoS information for each of the packets received on the particular port.

Assume that the VFP stage 210 detects that another set of packet received on one or more ports of the switch device 120 are of a DSCP type. In such an instance, because map 205-1 is used to identify QoS information associated with DSCP type of packets, the VFP stage 210 applies map 205-1 to identify different QoS levels for the DSCP type of packets.

Assume that the VFP stage 210 detects that yet another set of packets received on one or more ports of the switch device 120 are of a 802.1 type. In such an instance, the VFP stage 210 applies map 205-2 to identify different QoS levels for each of the 802 type of packets.

In this manner, the VFP stage 210 can be configured to apply different maps 205 to different types of received network packets 142 to identify a relative level of importance of the respective network packets.

In one embodiment, the IFP stage 210 sets internal QoS levels for all traffic types. For example, in one embodiment, the IFP stage 220 contains multiple rules specifying control protocol packets, such as STP BPDUs, OSPF hellos, ARP requests, etc. The control packets are assigned QoS levels based on their protocol type. The IFP stage also selects the QOS level for the data packets based on whether the packet is tagged, untagged, bridged, or routed, and information passed to it by VFP. In other words, the IFP uses classification information as detected by the VFP stage 220 in order to determine QoS information associated with the data packets. The appropriate HiGig scheduler queue is selected based on the assigned QoS level (as determined by the VFP if it is a data packet and as determined by the IFP if it is a control packet), thus ensuring preferential handling of the high priority traffic.

More specifically, the VFP stage 210 forwards the received packets and corresponding identified QoS information (as derived from the maps 205) to the IFP stage 220. IFP stage 220 includes data packet processor 230-1. For received network packets 142 that are data packets destined to device 126, the data packet processor 230-1 utilizes the QoS identified for each packet and determines an appropriate queue in the upstream interface 170 in which to forward each packets. The selected queue to which a respective packet is forwarded depends on the importance of the respective data packet as indicated by the respective QoS information.

Thus, in this manner, based on the QoS information identified for each of the received network packets 142, the IFP stage 220 of packet-processing unit 125 selects respective queues in which to forward the multiple packets to the upstream interface 170. The packet-processing unit 125 forwards the multiple packets to the selected respective queues.

The upstream interface 170 and respective queues can be configured to selectively drop packets due to over subscription on the ingress of the upstream interface. That is, if there is not sufficient bandwidth available for the upstream interface 170 to forward all packets in lower priority queues of the user interface to a destination, then the upstream interface 170 (queues, forwarding resources, etc.) drops the excess low priority packets in favor of delivery more important, higher priority packets (in high priority queues) to their respective destinations.

As discussed above, the packet-processing unit 125 can be configured to apply maps 205 to identify the QoS information for packets based on fast lookup pattern matching implemented by the packet-processing unit. In one embodiment, the packet-processing unit 125 can be configured to perform line speed lookups for the received network packets 142. In other words, the packet-processing unit 125 can substantially perform lookups of QoS information as fast or faster than a rate of receiving the packets on the respective ports of switch device 120. In one embodiment, the packet-processing unit performs lookups based on TCAM (Ternary Content Addressable Memory) type of technology.

If the IFP stage 220 in the packet-processing unit 120 detects that a received packet is a control packet (instead of a data packet), the IFP stage 220 can discard originally received QoS information for the network packet as was derived from the maps in a manner as previously discussed. In such an instance, if the network packet is a control plane packet (for configuring or control attributes of the network), the IFP stage 220 drops the identified QoS information received from the VFP stage 210 and applies control packet QoS assignment rules 240 to the control packets. In one embodiment, the control packet QoS assignment rules 240 are a set of control plane packet rules especially for determining control plane packet priority information for the control plane packets.

Based on QoS information as indicated by the control plane packet QoS assignment rules 240, the IFP stage 220 is able to identify appropriate QoS information for the control plane packets. Based on the QoS information identified for the control plane packets, the packet-processing unit 125 identifies appropriate queues in which to forward the control plane packets.

Thus, embodiments herein can include a packet-processing unit 125 configured to receive QoS information for a given packet of the multiple packets; detect that the given packet is a control plane packet; identify alternative QoS information for the control plane packet based on the control plane packet QoS assignment rules 240; and forward the control plane packet to the upstream interface based on the alternative QoS information derived for the control packets.

Figure 3:
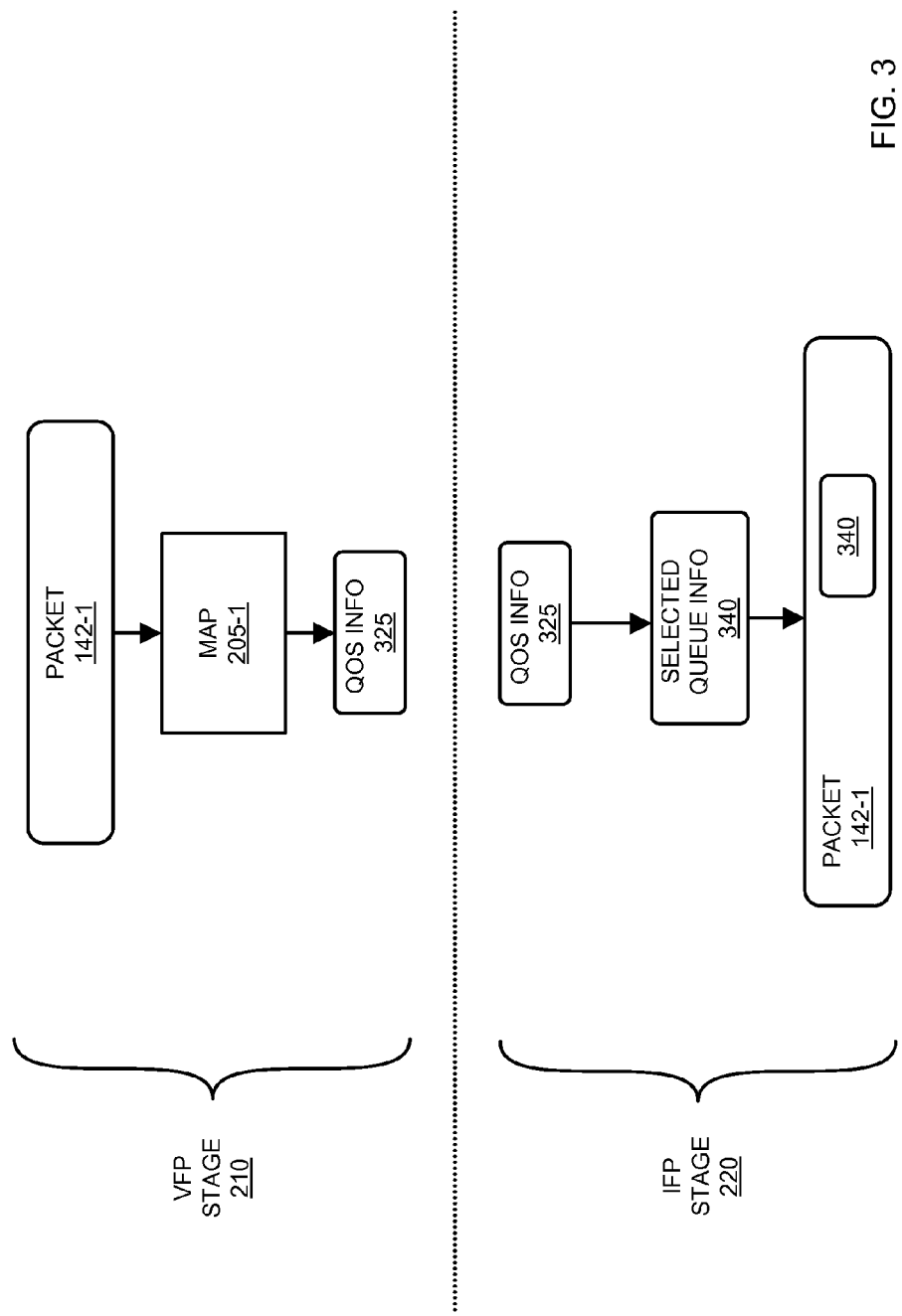
FIG. 3 is an example diagram illustrating use of identified QoS information to select a queue according to embodiments herein.

FIG. 3 is an example diagram illustrating modification of network packets according to embodiments herein. As shown, the VFP stage 210 receives a respective packet 142-1. The VFP stage 210 retrieves content from the packet 142-1 to identify attributes of the received packet 142-1. The VFP stage 210 then applies an appropriate map (in this case map 205-1) to identify QoS information 325 associated with the packet 142-1. As previously discussed, the VFP stage 210 forwards the packet 142-1 and the identified QoS information 325 for the received packet 142-1 to the IFP stage 220.

IFP stage 220 utilizes the QoS 325 identified for the packet 142-1 to select an appropriate queue in the upstream interface 170 in which to forward the packet 142-1. In this example, assume that the IFP stage 220 produces selected queue information 340. The selected queue information 340 identifies a particular type of queue in which to forward the packet 142-1. In one embodiment, the IFP stage 220 modifies a header of the packet 142-1 to include the selected queue information 340 for subsequent routing of the network packet 142-1 to the selected queue.

In one embodiment, the IFP stage 220 also passes the selected QoS level via priority field in a so-called HiGig header to the remote packet processor 135, which performs destination lookup, assigns outgoing packet DSCP and 802.1p values and forwards the packets through the fabric 124.

The IFP stage 220 forwards the packet in accordance with the selected queue information 340 stored in the packet 142-1.

Functionality supported by packet-processing unit 125 in switch device 120 will now be discussed via flowcharts in FIGS. 4-6. As discussed above, the packet-processing unit 125 implemented by a respective switch and/or other hardware can be configured to execute the steps in the flowcharts as discussed below.

Note that there will be some overlap with respect to concepts discussed above for FIGS. 1 through 3. Also, note that the steps in the flowcharts need not always be executed in the order shown. The steps can be executed in any suitable order.

Figure 4:
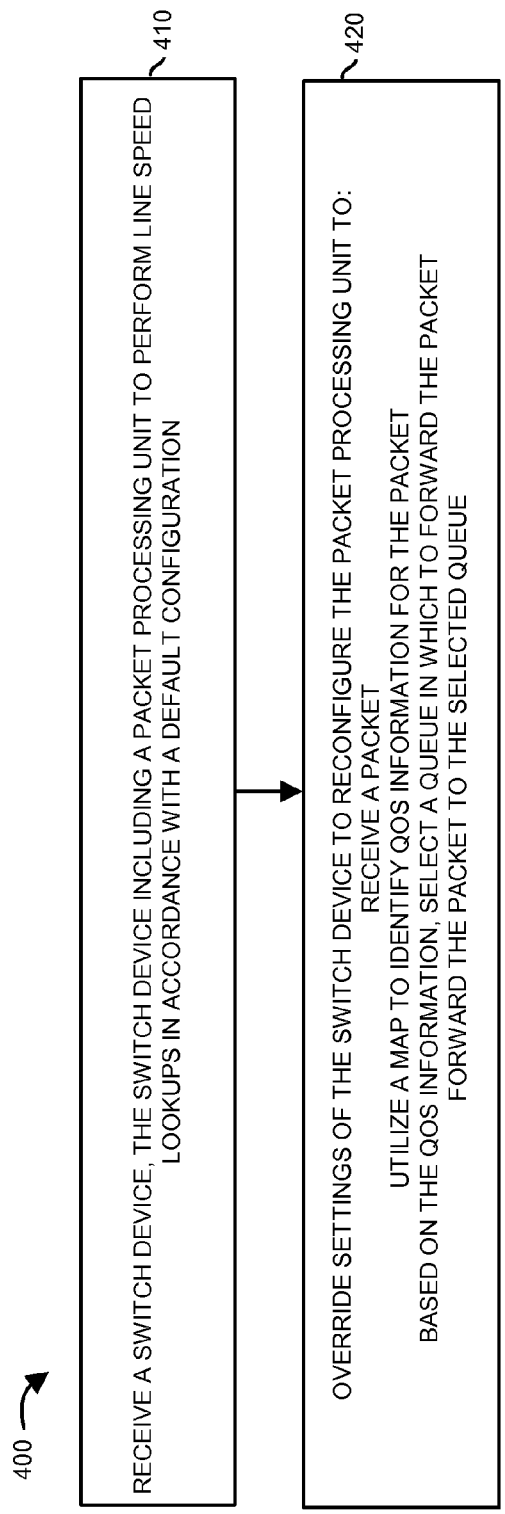
FIG. 4 is an example flowchart illustrating a technique of reconfiguring a switch device to perform operations according to embodiments herein.

FIG. 4 is a flowchart 400 illustrating a method of reconfiguring a switch device 120 according to embodiments herein.

In step 410, a system assembler receives switch device 120. The switch device 120 includes resources to perform line speed lookups in accordance with a default configuration of the switch device 120.

In step 420, the assembler overrides settings of the switch device to reconfigure the packet processing unit to: receive a packet 142-1; utilize a map 205-1 to identify QoS information for the packet 142-1; based on the QoS information 325, select a queue in which to forward the packet 142-1; and forward the packet 142-1 to the selected queue.

In an example embodiment, overriding default settings of the switch device 120 can include configuring the packet-processing unit to include multiple lookup tables in which to map received packets to respective QoS information. Overriding default settings of the switch device 120 also can include configuring the packet-processing unit 125 to be a multiple-stage QoS filter in which a first stage (e.g., a VFP stage 210) performs line speed lookups of QoS information for received packets and a second stage (e.g., an IFP stage 220) selects forwarding queues in which to forward the packets based on the QoS information.

In a more specific embodiment, an example QoS implementation for a Broadcom multi-layer Strata Switches utilizes two-stage ContentAware ingress filter processor. The switch device can be a Firebolt, Scorpion, and Trident type of device connected via HiGig interface to the up-stream packet processor. As previously discussed, the upstream interface such as a HiGig interface can be oversubscribed on ingress. This implementation of a two-stage filter processor allows managing ingress over subscription by intelligently discarding low priority traffic while guaranteeing bandwidth to the critical high priority traffic.

Figure 5:
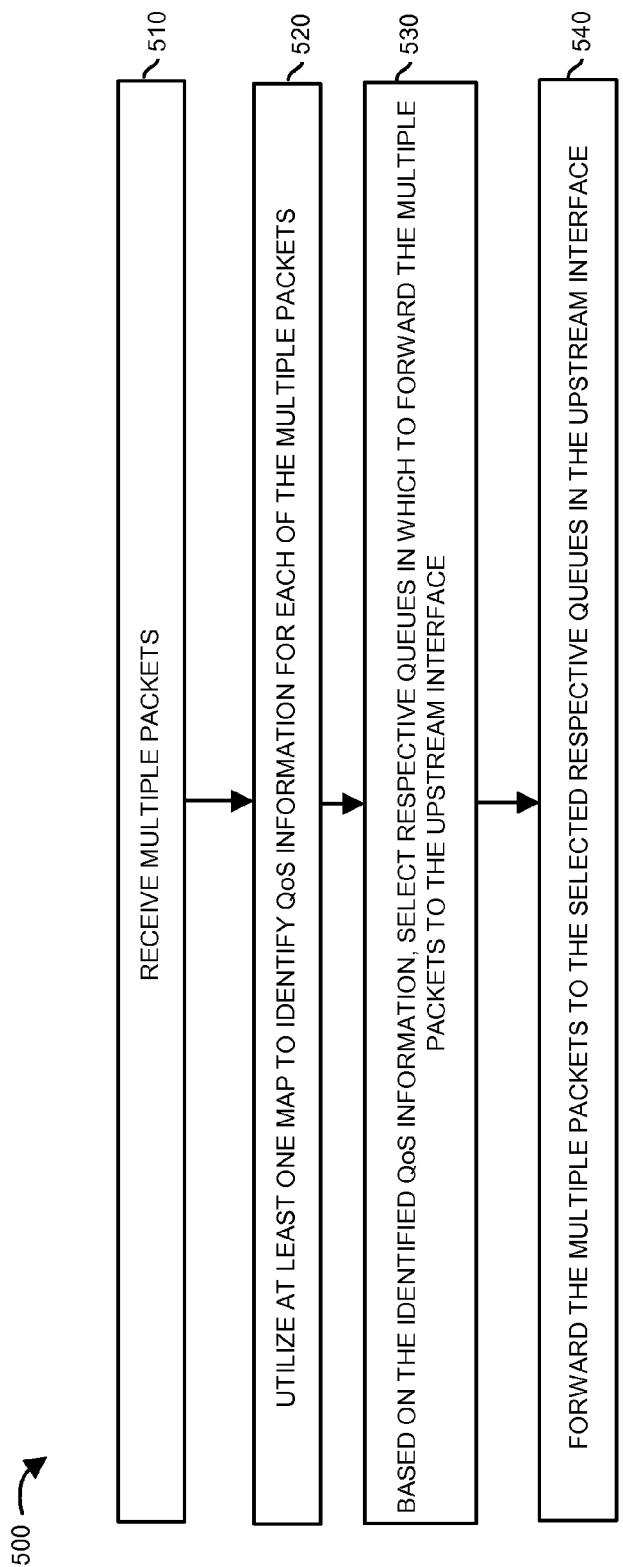
FIG. 5 is an example flowchart illustrating a technique of forwarding packets according to embodiments herein.

FIG. 5 is a flowchart 500 illustrating a method of processing packets according to embodiments herein.

In step 510, the switch device 120 receives multiple packets 142.

In step 520, the switch device 120 utilizes at least one map to identify QoS information for each of the multiple packets 142.

In step 530, based on the identified QoS information for the packets 142, the switch device 120 selects respective queues in which to forward the multiple packets to the upstream interface 170.

In step 520, the switch device 120 forwards the multiple packets 142 to the selected respective queues in the upstream interface 170.

FIG. 6 is a flowchart 600 illustrating a method of processing packets according to embodiments herein.

In step 610, the switch device 120 receives multiple packets 142.

In step 620, the switch device 120 utilizes at least one map 205 to identify QoS information for each of the multiple packets 142.

In step 630, the switch device 120 identifies the QoS information based on fast lookup pattern matching implemented by the packet-processing unit 125.

In step 640, based on the QoS information, the switch device 120 selects respective queues in which to forward the multiple packets 142 to the upstream interface 170.

In step 650, the switch device 120 forwards the multiple packets 142 to the selected respective queues.

In step 660, queues in the upstream interface 170 selectively drop one or more of the multiple packets 142 due to over subscription on the ingress of the upstream interface 170.

FIG. 7 is an example block diagram of a computer system 700 configured to provide switch processing associated with switch device 130 or other resources in network environment 100 according to embodiments herein. Note that the computer system 700 can reside in switch device 120 to provide any of the processing associated with packet-processing unit 125 to carry out operations as discussed herein.

Computer system 700 can be or include a computerized device such as a routing device, personal computer, workstation, portable computing device, console, network terminal, processing device, network device, operating as a switch, router, server, client, etc.

Note that the following discussion provides a basic embodiment indicating how to carry out functionality associated with packet-processing unit 125 as previously discussed. However, it should be noted that the actual configuration for carrying out the operations as described herein can vary depending on a respective application.

As shown, computer system 700 of the present example includes an interconnect 711 that couples computer readable storage media 712 such as a non-transitory type of media, computer readable, hardware storage medium, etc., in which digital information can be stored and retrieved. Computer system 700 can further include a processor 713 (e.g., hardware), I/O interface 714, and a communications interface 717.

I/O interface 714 provides connectivity to repository 180, and if present, display screen, peripheral devices 716 such as a keyboard, a computer mouse, etc.

Computer readable storage medium 712 (e.g., a hardware storage media) can be any suitable device and/or hardware such as memory, optical storage, hard drive, floppy disk, etc. The computer readable storage medium can be a non-transitory storage media to store instructions associated with packet-processing unit application 125-1. The instructions are executed by a respective resource such as processor 713 to perform any of the operations as discussed herein.

Communications interface 717 enables computer system 700 to communicate over network 190 to retrieve information from remote sources and communicate with other computers, switches, clients, servers, etc. I/O interface 714 also enables processor 713 to retrieve or attempt retrieval of stored information from repository 180.

As shown, computer readable storage media 712 can be encoded with packet-processing unit application 125-1 executed by processor 713 as packet-processing unit process 125-2.

Computer system 700 can include a processor to execute such instructions and carry out network management operations as discussed herein. Accordingly, when executed, the code associated with packet-processing unit application 125-1 can support processing functionality such as forwarding of data packets, processing of control plane packets, etc., as discussed herein.

During operation of one embodiment, processor 713 accesses computer readable storage media 712 via the use of interconnect 711 in order to launch, run, execute, interpret or otherwise perform the instructions of packet-processing unit application 125-1 stored in computer readable storage medium 712. Execution of the packet-processing unit application 125-1 produces processing functionality in processor 713. In other words, the packet-processing unit process 125-2 associated with processor 713 represents one or more aspects of executing packet-processing unit application 125-1 within or upon the processor 713 in the computer system 700.

Those skilled in the art will understand that the computer system 700 can include other processes and/or software and hardware components, such as an operating system that controls allocation and use of hardware processing resources to execute packet-processing unit application 125-1.

In accordance with different embodiments, note that computer system 700 may be any of various types of devices, including, but not limited to, a personal computer system, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or, in general, any type of computing or electronic device.

Note again that techniques herein are well suited for use in processing an forwarding packets. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method of implementing a packet processing unit in a switch device in communication with an upstream interface that is oversubscribed on ingress, the method comprising:
in the packet processing unit:
receiving multiple packets;

utilizing at least one map to identify Quality of Service (QoS) information for each of the multiple packets, wherein utilizing the at least one map to identify QoS information includes:
for a given packet of the multiple packets:
selecting a QoS priority level amongst multiple different QoS priority levels; and
prior to forwarding, modifying a header in the given packet to include the selected QoS priority level;
based on the QoS information, select respective queues in which to forward the multiple packets to the upstream interface; and
forwarding the multiple packets to the selected respective queues;
wherein said at least one map contains port QoS levels and information on whether the port is trusted at L2 and L3 traffic layers.

2. The method as in claim 1 further comprising:
identifying the QoS information based on fast lookup pattern matching implemented by the packet processing unit.

3. The method as in claim 1 further comprising:
in the upstream interface, selectively dropping at least one of the multiple packets due to oversubscription on the ingress of the upstream interface.

4. The method as in claim 1, wherein the packet processing unit is configured to perform line speed lookups for the multiple packets.

5. The method as in claim 1 further comprising:
receiving QoS information for a given packet of the multiple packets;
detecting that the given packet is a control plane packet;
identifying alternative QoS information for the control plane packet; and
forwarding the control plane packet to the upstream interface based on the alternative QoS information.

6. The method as in claim 1 further comprising:
updating the at least one map based on received configuration information.

7. The method as in claim 1 further comprising:
identifying the QoS information based on fast lookup pattern matching implemented by the packet processing unit, the packet processing unit configured to perform line speed lookups for the multiple packets;
in the upstream interface, selectively dropping at least one of the multiple packets due to over subscription of packets on the ingress of the upstream interface; and
wherein utilizing the at least one map to identify QoS information includes:
for a given packet of the multiple packets:
selecting a QoS priority level amongst multiple different QoS priority levels; and
prior to forwarding to the upstream interface, modifying a header in the given packet to include the selected QoS priority level.

8. A method comprising:
receiving packets at a switch device, the switch device including a packet processing unit to perform line speed lookups in accordance with a default configuration of the switch device;
overriding settings of the switch device to reconfigure the packet processing unit to:
receive a packet;
utilizing a map to identify Quality of service (QoS) information for the packet, wherein utilizing a map to identify QoS information includes:
for a given packet of the multiple packets:
selecting a QoS priority level amongst multiple different QoS priority levels; and
prior to forwarding, modifying a header in the given packet to include the selected QoS priority level;
based on the QoS information, select a queue in which to forward the packet; and
forward the packet to the selected queue;
wherein said map contains port QoS levels and information on whether the port is trusted at L2 and L3 traffic layers.

9. The method as in claim 8, wherein overriding settings of the switch device includes:
configuring the packet processing unit to be a multiple-stage QoS filter in which a first stage performs line speed lookups of QoS information for received packets and a second stage selects forwarding queues in which to forward the packets based on the QoS information.

10. The method as in claim 9, wherein the default configuration of the switch device is configured to classify and forward received packets based on VLAN information.

11. The method as in claim 8, wherein overriding settings of the switch device includes:
configuring the packet processing unit to include multiple lookup tables in which to map received packets to respective QoS information.

12. A switch device comprising:
a packet processing unit, the packet processing unit in communication with an upstream interface that is oversubscribed with too many packets on ingress;
the packet processing unit in the switch device reconfigured to:
receive multiple packets;
utilize at least one map to identify Quality of Service (QoS) information for each of the multiple packets, wherein utilizing the at least one map to identify QoS information includes:
for a given packet of the multiple packets:
selecting a QoS priority level amongst multiple different QoS priority levels; and
prior to forwarding, modifying a header in the given packet to include the selected QoS priority level;
based on the QoS information, select respective queues in which to forward the multiple packets upstream; and
forward the multiple packets to the respective queues in the upstream interface;
wherein said at least one map contains port QoS levels and information on whether the port is trusted at L2 and L3 traffic layers.

13. The switch device as in claim 12, wherein the packet processing unit is configured to identifying the QoS information at line rate speeds of receiving the multiple packets at the switch device.

14. The switch device as in claim 12 further comprising:
in the upstream interface, selectively dropping at least one of the multiple packets due to over subscription.

15. The switch device as in claim 12, wherein the packet processing unit is configured to:
receive QoS information for a given packet of the multiple packets;
detect that the given packet is a control plane packet;
identify alternative QoS information for the control plane packet; and
forward the control plane packet to the upstream interface based on the alternative QoS information.

16. The switch device as in claim 12, wherein the packet processing unit is configured to:

update the at least one map based on received mapping information.

\* \* \* \* \*